H. Olds.

Extension Table.

No. 3,761. Reissued Dec. 14, 1869.

Witnesses;
H. Wharton
E R Lewis

Inventor;
H. Olds

N. PETERS, PHOTO-LITHOGRAPHER, WASHINGTON, D. C.

United States Patent Office.

H. OLDS, OF SYRACUSE, NEW YORK.

*Letters Patent No.* 68,782, *dated September* 10, 1867; *reissue No.* 3,761, *dated December* 14, 1869.

IMPROVED SLIDE FOR EXTENSION-TABLES.

The Schedule referred to in these Letters Patent and making part of the same

I, H. OLDS, of Syracuse, in the county of Onondaga, and State of New York, have invented certain Improvements in Slides for Extension-Tables, of which the following is a specification.

My invention has for its object an improvement and simplification of the slides for extension-tables, easy of application, and cheap and durable.

Figure 2:
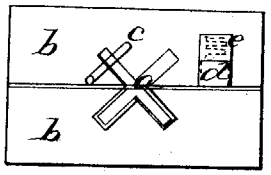
Figure 2 is a cross-section on line *x x* of fig. 1.

The parts consist of certain metal slides, lettered *a* in the drawing, which are formed like a cross in their cross-section, as seen in fig. 2, the arms of the cross being planes, intersecting at right angles, and of a length and breadth sufficient for the purpose to which they are applied, as clearly indicated in the drawing.

My form of slide enables me to construct the slide-bars *b* by machinery, with grooves cut therein with saws, so as to form a counterpart to the slide *a* without other finish, which greatly facilitates and cheapens its construction and application.

The slides *a* are placed in the grooves aforesaid, cut in the faces of the slide-bars *b*, one-half of the slide *a* fitting into each bar *b*, as clearly indicated in cross-section, fig. 2, one of the slides *a* being affixed in the grooves of one of the slide-bars *b* at one end, and another likewise affixed to the other slide-bar *b* at the opposite end. They may be fastened by stay-pins or screws *c*, or in any other efficient manner that will securely hold them in place.

Figure 1:
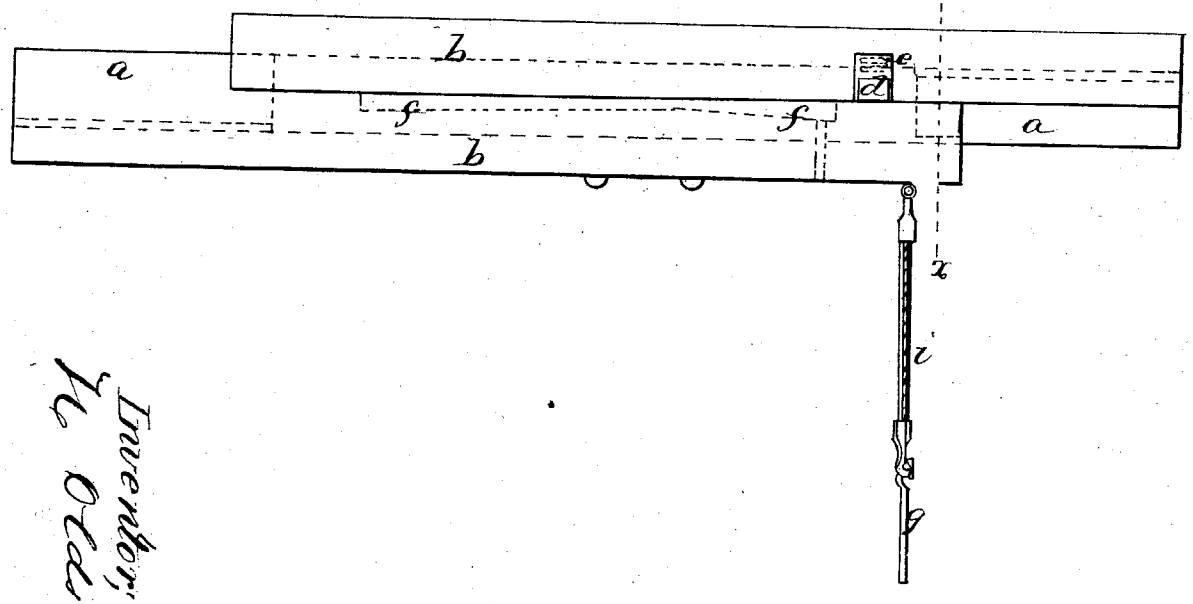
Figure 1 is a side view.

To limit the range of motion of the slide-bars *b*, so that they cannot be drawn too far out, or slide too far in, a groove may be cut in one face of one of the slide-bars *b*, as seen by the dotted lines *f*, fig. 1; and in the opposite slide-bar there is a recess, in which a small bolt or pin, *d*, fits, and is forced outward into said groove by a spring, *e*.

To free the bars, a pin, *g*, may be thrust into the hole *h*, and push back the bolt *d*, so as to release the bars from the stop.

The pin *g* may be attached to the slide-bar *b* by a cord, *i*.

It is obvious that the pin *d* may be permanent or movable, as desired, without changing its character as a stop to govern the range of motion of the slides, which is its principal purpose.

Having thus fully described my invention,

What I claim therein as new, and for which I desire to secure Letters Patent, is—

The metal slides *a*, made in the form of a cross, as herein specifically set forth, and working in corresponding grooves in the slide-bars *b*, constructed, arranged, and combined as herein specified.

H. OLDS.

Witnesses:
H. WHEATON,
E. R. LEWIS.